April 11, 1950

F. CREMER ET AL 2,503,803

METHOD OF AND APPARATUS FOR TESTING OBJECTS
MADE OF INSULATING MATERIAL

Filed Dec. 18, 1942

INVENTORS
Fritz Cremer,
Stephan Steinitz &
Jac. R. Mannheimer
BY Mock & Blum
ATTORNEYS April 11, 1950 F. CREMER ET AL 2,503,803
METHOD OF AND APPARATUS FOR TESTING OBJECTS
MADE OF INSULATING MATERIAL
Filed Dec. 18, 1942 9 Sheets-Sheet 6

INVENTORS
Fritz Cremer, Stephan Steinitz
& Jac. R. Manheimer
BY Mock & Blum
ATTORNEYS April 11, 1950     F. CREMER ET AL     2,503,803
METHOD OF AND APPARATUS FOR TESTING OBJECTS
MADE OF INSULATING MATERIAL Filed Dec. 18, 1942     9 Sheets-Sheet 7

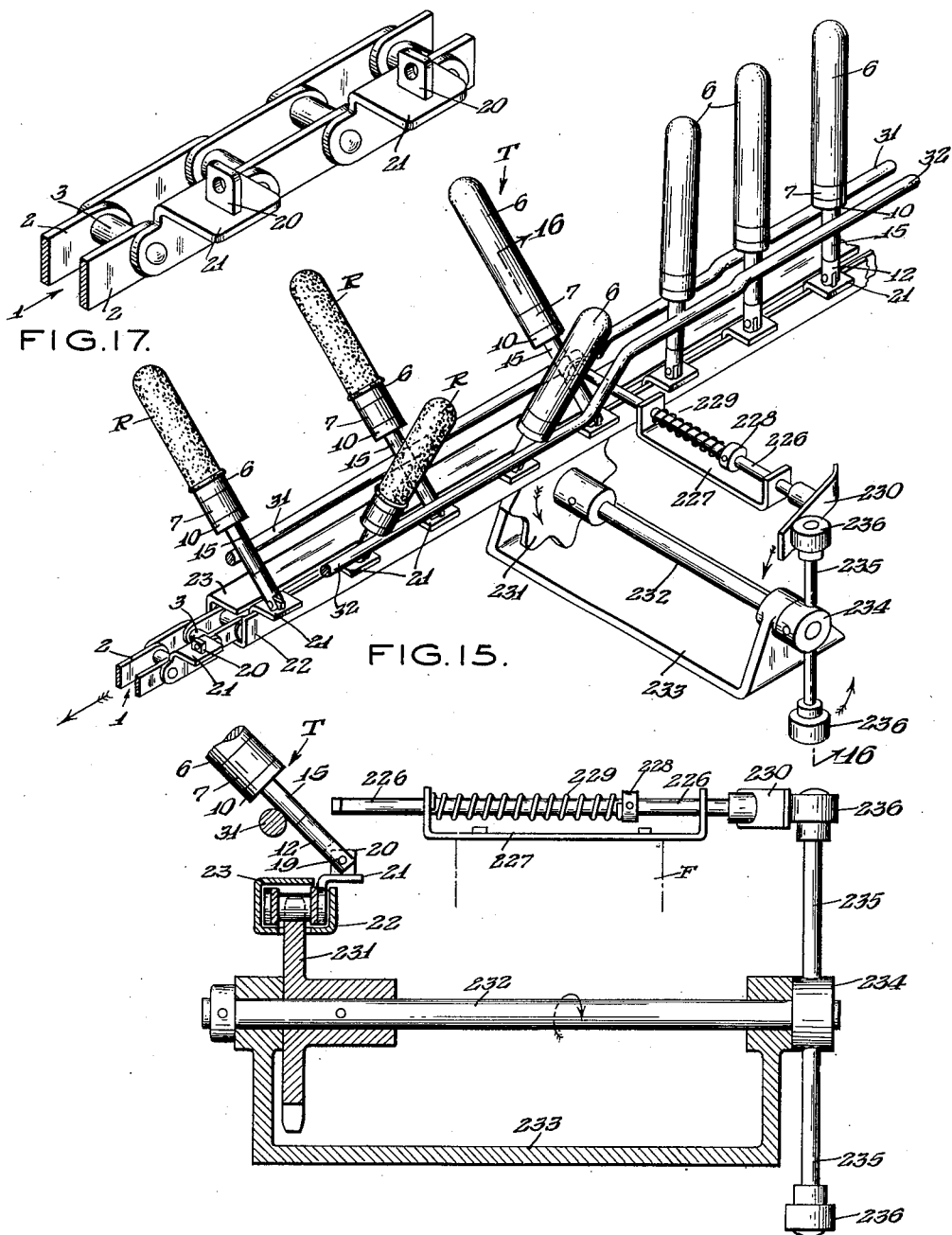

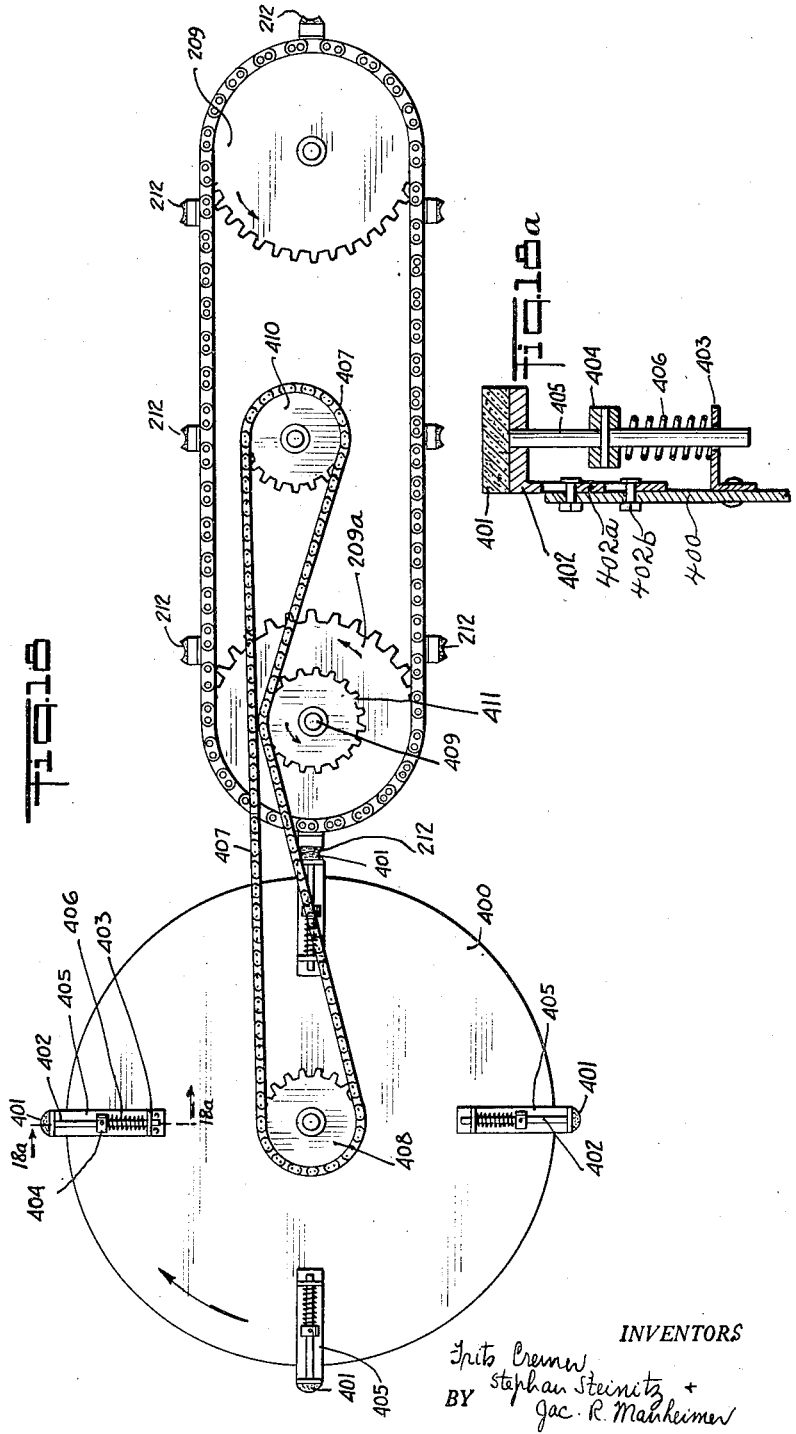

Patented Apr. 11, 1950

2,503,803

UNITED STATES PATENT OFFICE 2,503,803

METHOD OF AND APPARATUS FOR TESTING OBJECTS MADE OF INSULATING MATERIAL

Frits Cremer, Montclair, N. J., and Stephan Steinitz and Jac. R. Manheimer, New York, N. Y.; said Cremer and said Steinitz assignors to said Manheimer Application December 18, 1942, Serial No. 469,436

10 Claims. (Cl. 209—81)

1

Our invention relates to a new and improved method of and apparatus for testing objects made of insulating material, including rubber prophylactics. The objects may be hollow or solid, and of any shape.

The principal objects of our invention are to subject the wall of the rubber article to a dielectric stress which will rupture said wall at thin and defective imperforate portions thereof and also to enlarge minute perforations in said wall by said dielectric stress before electrically testing the condition of said wall; to apply said rupturing dielectric stress to said wall while the rubber article is mounted in smooth and slightly stretched condition upon a metal carrier or form; then to remove residual electric charge from said form so that said residual charge will not affect the proper segregation of perfect rubber objects from imperfect rubber objects in the subsequent tests; then to apply the terminals of a source of direct electric current or other electric current respectively to said form and to a conductive liquid in which the rubber object is partially immersed, after said residual charge has been removed, in order to classify the forms which have good rubber objects from the forms which have defective rubber objects, by means of the difference in charge which is thus impressed upon the respective form; to use a mechanically operated classifying or selecting element which is set to one of a plurality of classifying positions by electro-magnetic means which are governed by said difference in impressed charge, before the form which carries the object which is to be classified, is moved into contact with said selecting element; to mount the forms turnably on an endless conveyor and to classify the respective forms into two respective series which are respectively oppositely inclined relative to the longitudinal median vertical plane of said conveyor, so that the "good" forms which carry the good rubber objects are classified in one of said series and the "bad" forms which carry the defective rubber objects are classified in the other of said series; to use said mechanism in combination with a continuously moving endless conveyor; to strip the rubber objects from said forms while said forms are thus classified, in order to separate the good rubber objects from the defective rubber objects; to apply an electrical test which will produce substantially the same results as the pressure leakage test in which the rubber object is subjected to liquid under pressure; to produce an electrical testing pulse or signal whose intensity will regulate a control electronic

2 tube, which controls the passage of current through a main electronic tube through which the current for operating the classifying device is passed; to provide improved means for marking the classified good rubber objects, without injuring said objects and to produce a simple and efficient method and mechanism which will operate continuously and reliably at high speed.

Numerous additional objects of our invention will be set forth in the following description and drawings which illustrate a preferred embodiment thereof.

Fig. 2 is a continuation of Fig. 1.

Fig. 15 is a detail perspective view of the tilting mechanism which tilts the successive forms alternately in opposite directions.

Fig. 16 is a sectional view on the line 16—16 of Fig. 15.

Fig. 17 is a detail perspective view of the main conveyor on which the forms are mounted.

Fig. 18 shows a modification of the printing or stamping mechanism.

Fig. 18a is a section on the line 18a—18a of Fig. 18.

Figure 1:
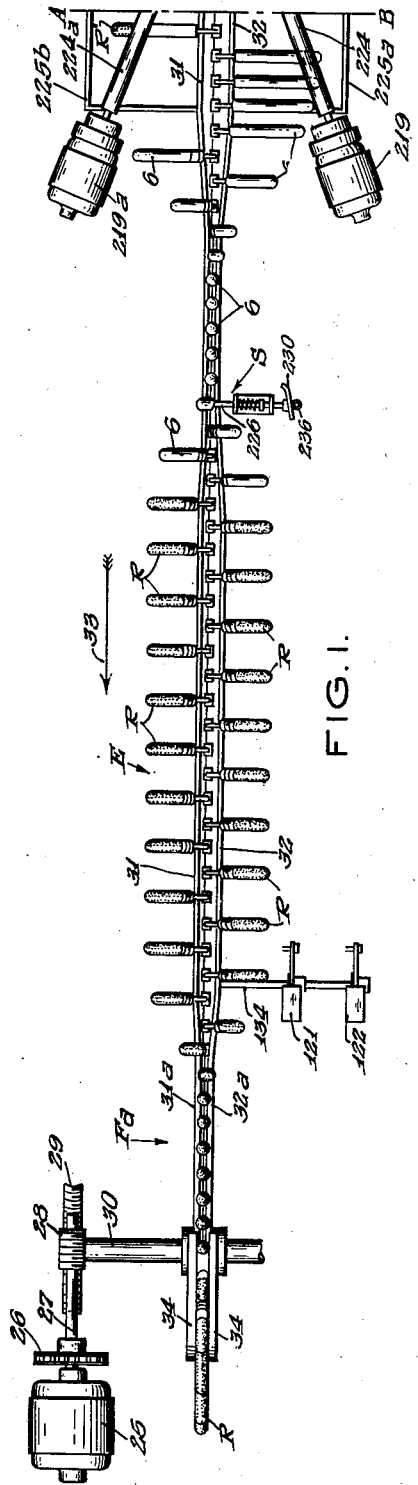
Fig. 1 is a top plan view of the left-hand end portion of the improved machine.

For convenience, the essential mechanical parts of the improved apparatus will be described before describing the electrical parts thereof.

The apparatus is provided with an endless conveyor 1. As shown in Fig. 17, said conveyor 1 consists of rigid links 2, which are turnably connected by means of pivot pins 3. Alternate links 2 have integral rigid brackets 21, which are provided with respective perforated lugs 20.

Figure 3:
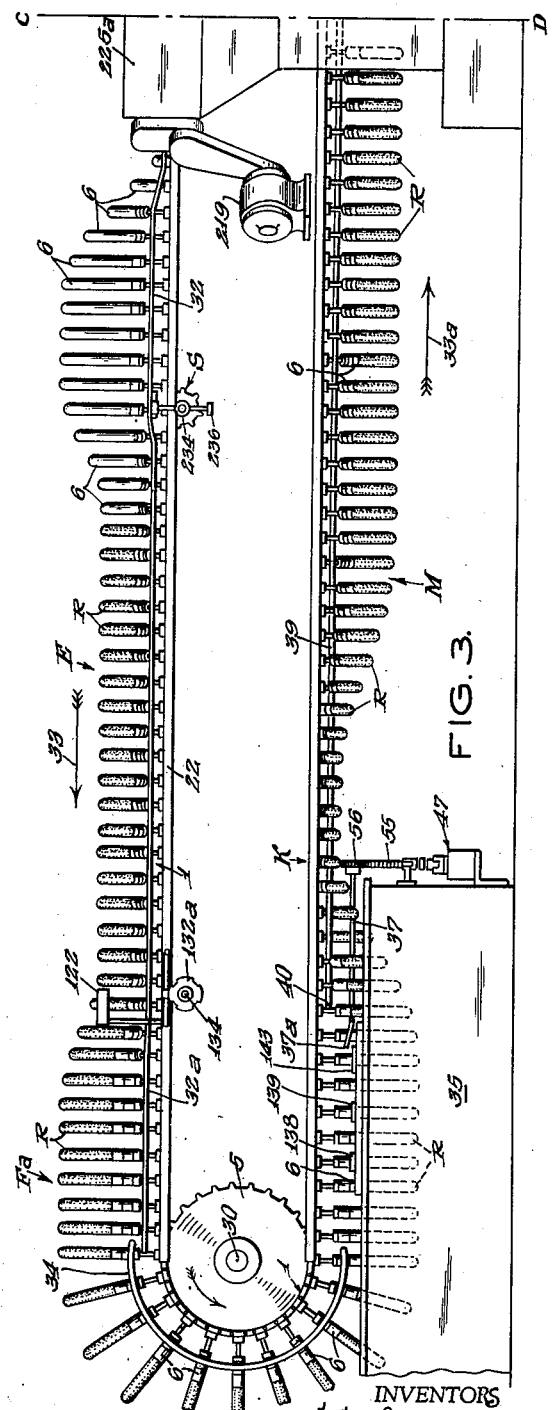
Fig. 3 is a side elevation of Fig. 1.
Figure 4:
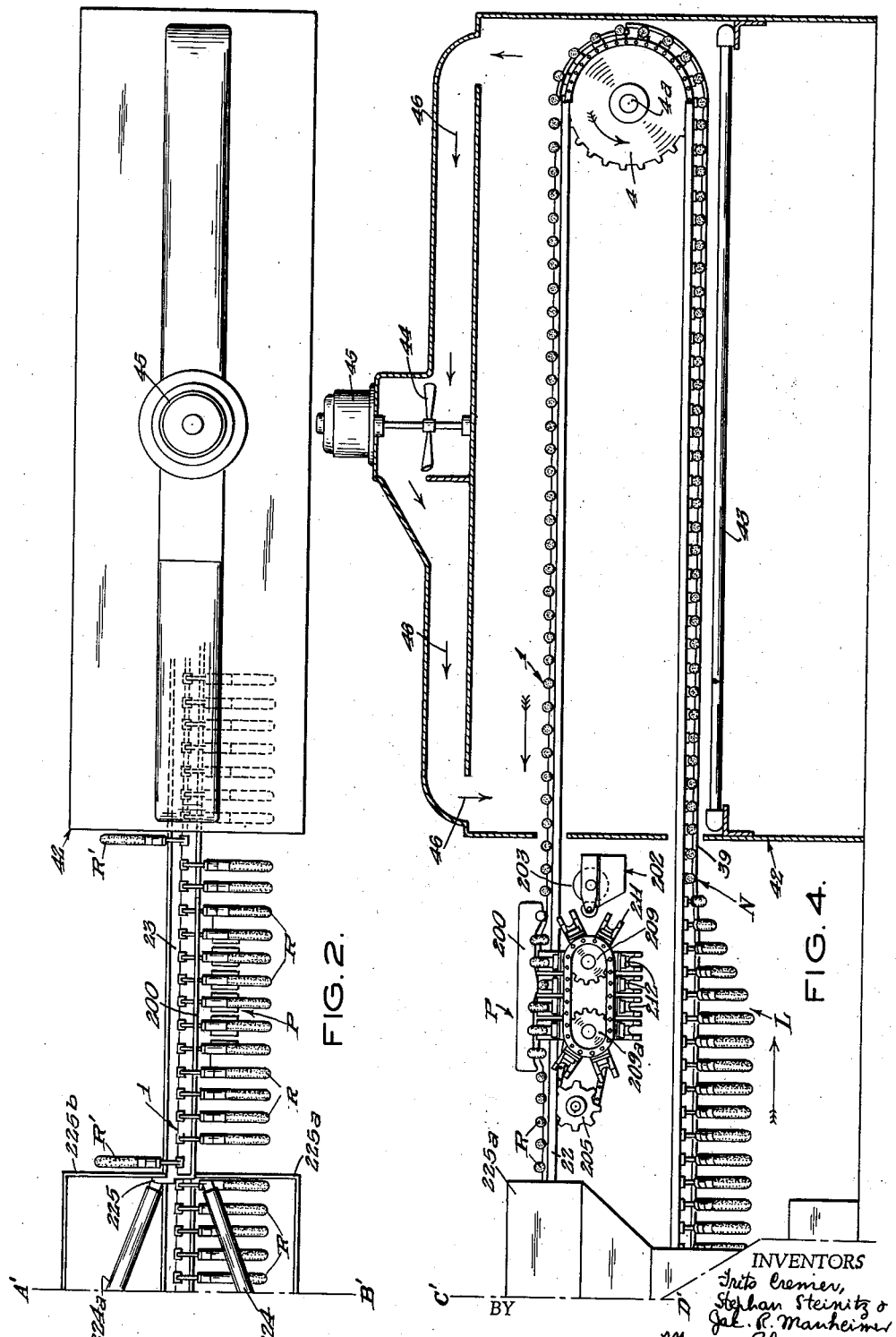
Fig. 4 is a side elevation of Fig. 2.

As shown in Figs. 3 and 4, the conveyor 1 is supported upon sprockets 4 and 5, which are fixed respectively to the idler shaft 4a and to the driven shaft 30. The shaft 30 is driven by the motor 25, which is shown in Fig. 1, by any suitable reduction gearing. The shaft of said motor 25 is connected by a chain to the sprocket 26, which is fixed to shaft 27, which has a worm 28 which meshes with the worm gear 29, which is fixed to the shaft 30.

Figures 11, 12:
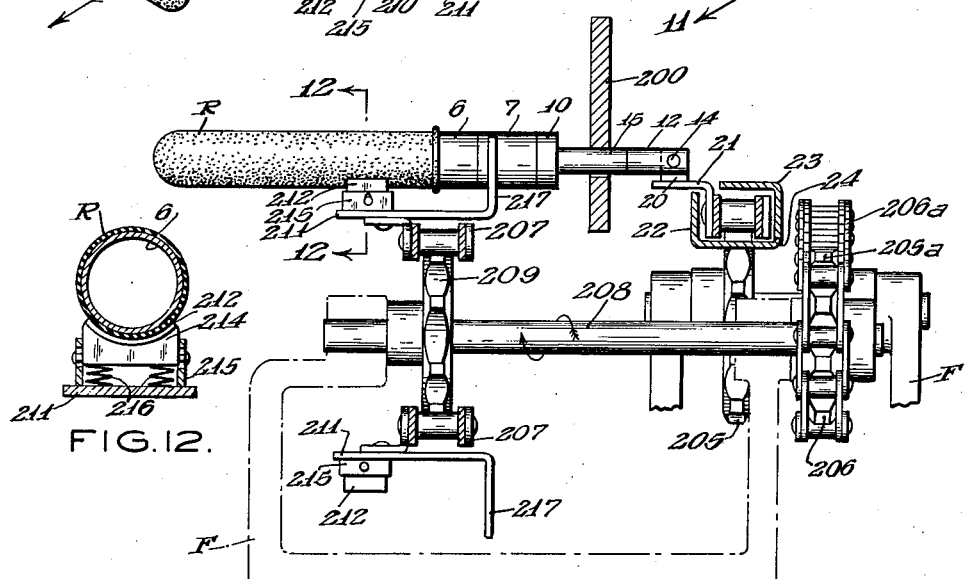
Fig. 11 is a sectional view on the line 11—11 of Fig. 10.
Fig. 12 is a sectional view on the line 12—12 of Fig. 11.

Fig. 11 shows rigid and stationary angle pieces 22 and 23 which are fixed to each other at their abutting edges 24. Said angle pieces 22 and 23 guide the straight top run and the straight bottom run of the conveyor 1, and in addition the horizontal legs of the angle piece 22 support the weight of said top run and of said bottom run.

A series of metal forms 6 are tiltably connected to the conveyor 1.

Figure 7:
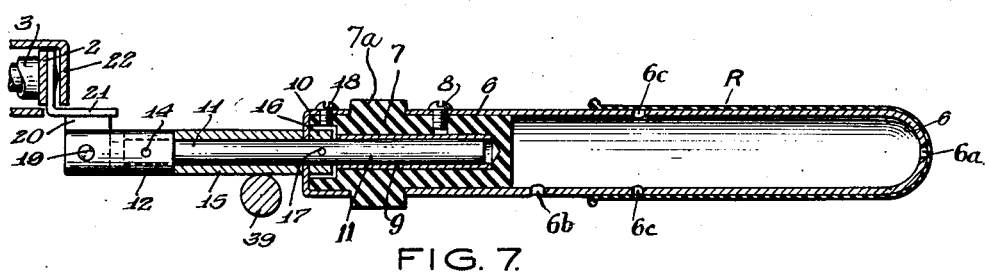
Fig. 7 is a sectional view, partially in elevation, showing a form and certain associated parts. This view is in greater detail than other views which show the same parts.

As shown in Fig. 7, each metal form 6 is fixed to a mount or support 7, which is made of insulating material, by means of a screw 8. This screw 8, and the screw 18 later described, may be headless or of the familiar flat-head type, so that their outer ends will be flush or substantially flush, with the respective associated parts. Fig. 7 also shows the shape of the rubber object R, which has a closed outer end and an open inner end. A metal bushing 9 is rigidly fixed to each insulating mount 7, by means of a drive fit or the like. The inner end of each screw 8 is spaced from the respective metal bushing 9. A pivot pin 11 is partially located in each bushing 9. Said pivot pin 11 passes through a perforation in the end wall of a metal ferrule or cup 10, which is fixed to the insulating support 7 by means of a screw 18. A collar 16 is fixed to each pivot pin 11 by means of a fastening member 17. Each pivot pin 11 has a head 12 fixed thereto by means of a fastening member 14. The inner end of each head 12 is forked. A respective lug 20 is located between the legs of each forked head 12 and said legs are pivotally connected to the respective lug 20 by means of a pivot pin 19. A sleeve or collar 15 is turnably mounted on each pivot pin 11, between the respective head 12 and the end wall of the respective ferrule or cup 10. Each form 6 can turn freely around the longitudinal axis of the respective pivot pin 11, in unison with the respective metal bushing 9, the respective insulating support 7, and the respective metal cup 10. The respective forms 6 can also be readily tilted relative to the longitudinal plane of the conveyor 1.

Rigid stationary guides 31 and 32 are provided at the top run of the conveyor 1. As shown in Fig. 1, the horizontal spacing between respective portions of said fixed guides 31 and 32 is non-uniform. Fig. 1 shows the loading station E at which the operators place the rubber objects upon the respective forms 6. Two operators may load the objects on the forms at the respective sides of station E. The successive forms 6 are maintained alternately tilted in opposite directions, relative to said longitudinal median vertical plane of the endless conveyor 1, at said loading station E. At said loading station E, the fixed guides 31 and 32 are sufficiently horizontally spaced to permit the forms to be thus divided into two series, the forms of one series being inclined oppositely to the forms of the other series. The rotatable sleeves or collars 15 abut said fixed guides 31 and 32, and other fixed guides which are provided in the mechanism, in order to minimize friction.

The mechanism for separating the forms into two oppositely inclined series at the station S, directly anterior station E, is shown in detail in Figs. 15 and 16.

A sprocket 231 is fixed to shaft 232 which is turnably supported in bearings of a bracket 233, which is fixed to the frame F of the machine. Said sprocket 231 meshes with the pivot pins 3 of the conveyor 1, so that said conveyor rotates said shaft 232 in the direction which is indicated by the curved arrows in Figs. 15 and 16. A head 234 is fixed to the shaft 232. A straight rod 235 is fixed to the head 234, so that said rod 235 rotates in unison with the shaft 232. The ends of said rod 235 are provided with turnable rolls 236. A push rod 226 is slidably mounted in a bearing 227, which is suitably fixed to the frame F of the machine. A head 228 is fixed to said push rod 226. A compression spring 229 biases the push rod 226 to a normal position in which its free end clears the forms. A shoe 230 is fixed to one end of the push rod 226. Said shoe 230 is substantially planar and it is inclined to the longitudinal axis of the rod 226. When either roll 236 contacts with the shoe 230, the push rod 226 is pushed to the operative position shown in Fig. 15, in which it tilts the respective form 6 to the tilted position which is indicated by the reference letter T in Figs. 15 and 16. Alternate forms are thus tilted by the push rod 226 to the right, if the observer is looking in the direction of the arrow 33, which indicates the direction of movement of the top run of the conveyor 1, as indicated in Figs. 1 and 3. In Fig. 3, the arrow 33a indicates the direction of movement of the bottom run of the conveyor 1. The fixed guide 32 is shaped so that the alternate forms which are not tilted by the push rod 226, are automatically tilted by gravity to the left, as indicated in Figs. 1 and 15. The fixed guides 31 and 32 have portions 31a and 32a which succeed the loading station E, in order to provide an observation station Fa. Said portions 31a and 32a are sufficiently close to each other, to maintain the axes of the forms vertically upright, at said observation station F. Each elastic rubber object should be mounted upon the respective form, in smooth and slightly stretched condition. Fixed guides 34 are provided at each side of each of the sprockets 4 and 5, so that the axes of the forms are maintained in a vertical plane in the curved end portions of the conveyor 1.

Figure 5:
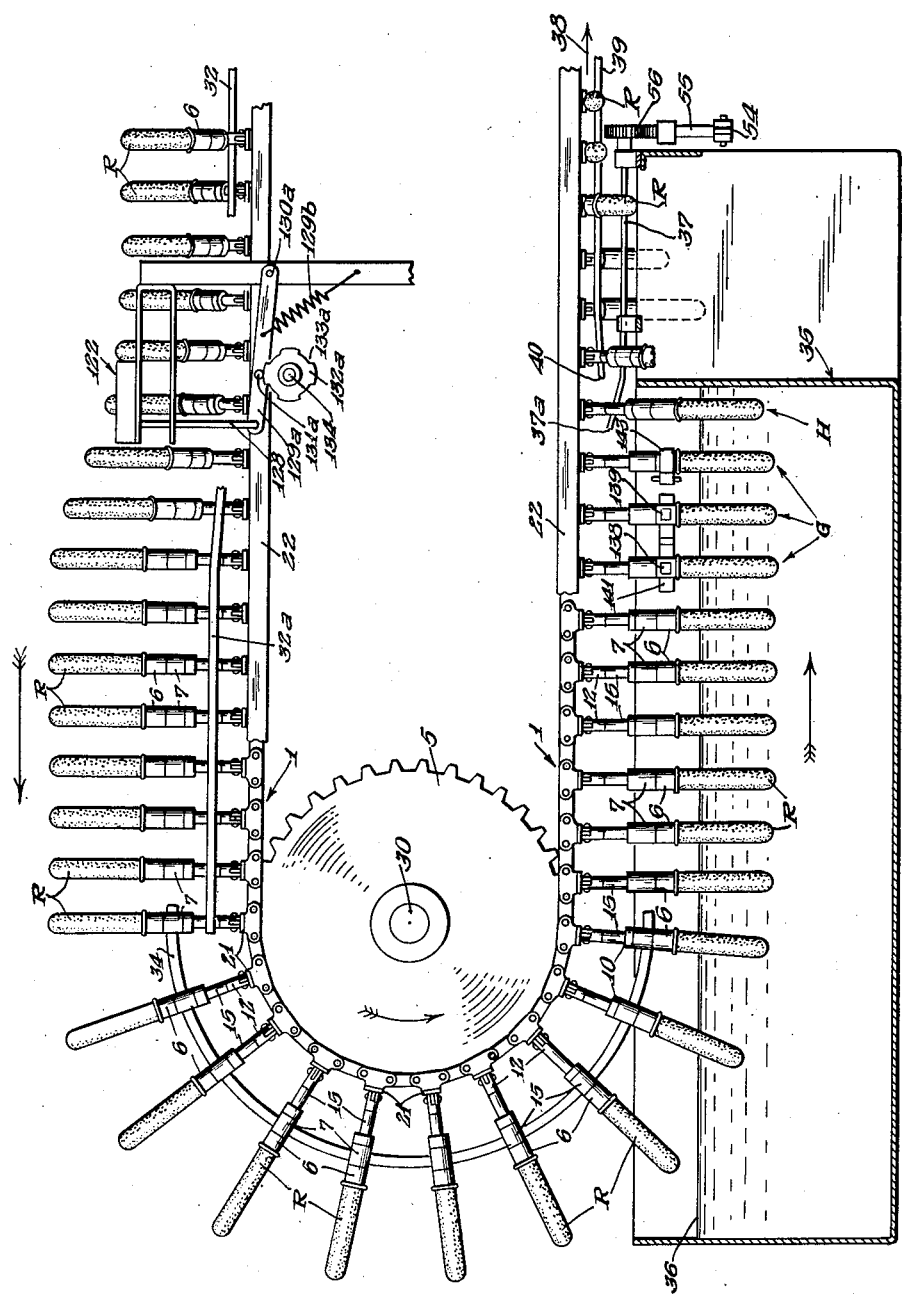
Fig. 5 is an enlarged detail view of the left-hand part of Fig. 3.
Figure 6:
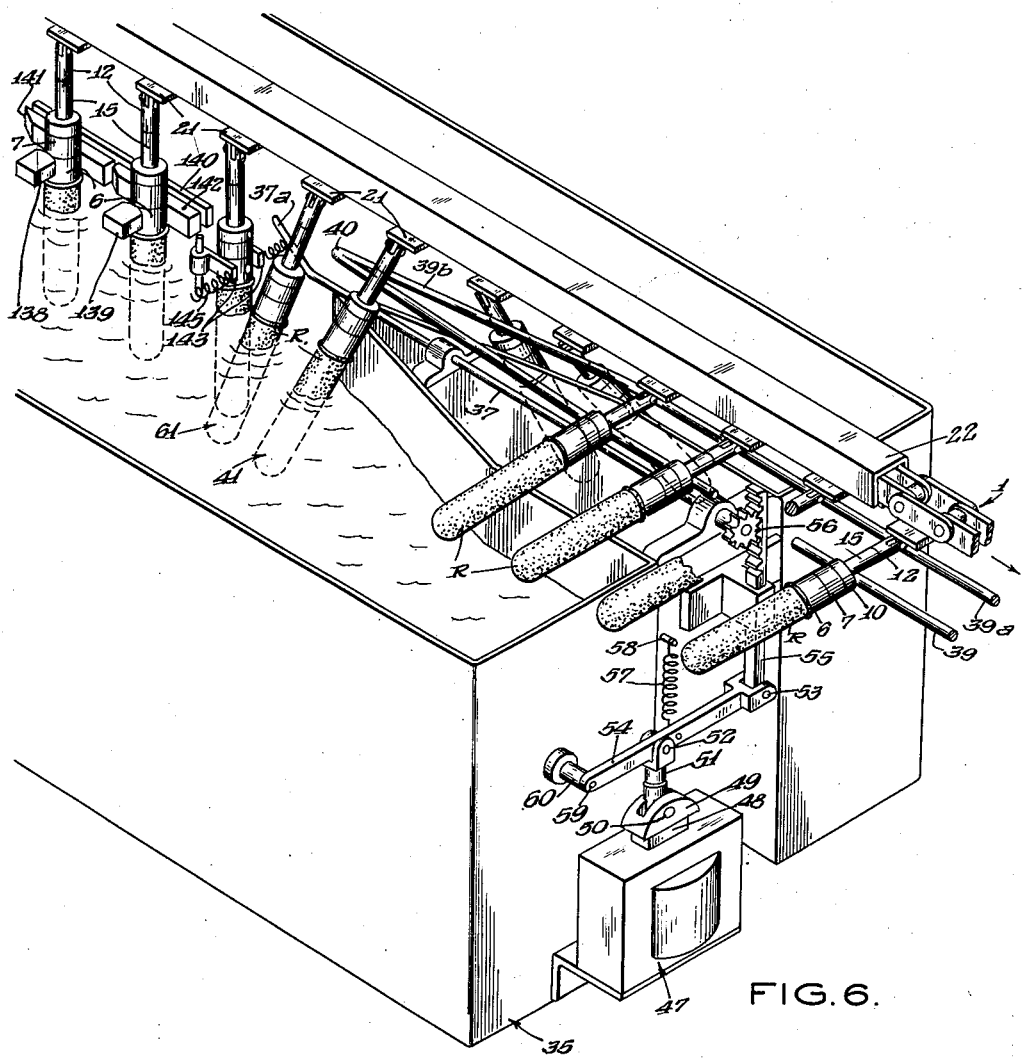
Fig. 6 is a perspective view which illustrates the testing tank and the essential mechanical parts of the automatic selector mechanism.

As shown in Fig. 5, each rubber object R is immersed only partially in the conductive testing liquid which is contained in a grounded metal tank 35. As shown in Fig. 6, the right-hand end wall of said tank has an angular recess. The level of the top of said body of conductive liquid is indicated in Fig. 5 by the reference number 36. The bare parts of the forms 6 do not contact with the conductive testing liquid. Said conductive liquid may be an aqueous soap solution or any other conductive liquid which will not injure the thin-walled rubber objects R. Each metal form 6 is therefore insulated from said conducting liquid, if a perfect rubber object R is mounted thereon. If a form 6 and said conductive liquid are connected to the opposite terminals of a source of electric current, the respective perfect rubber object then acts as the dielectric of a condenser.

Figure 8:
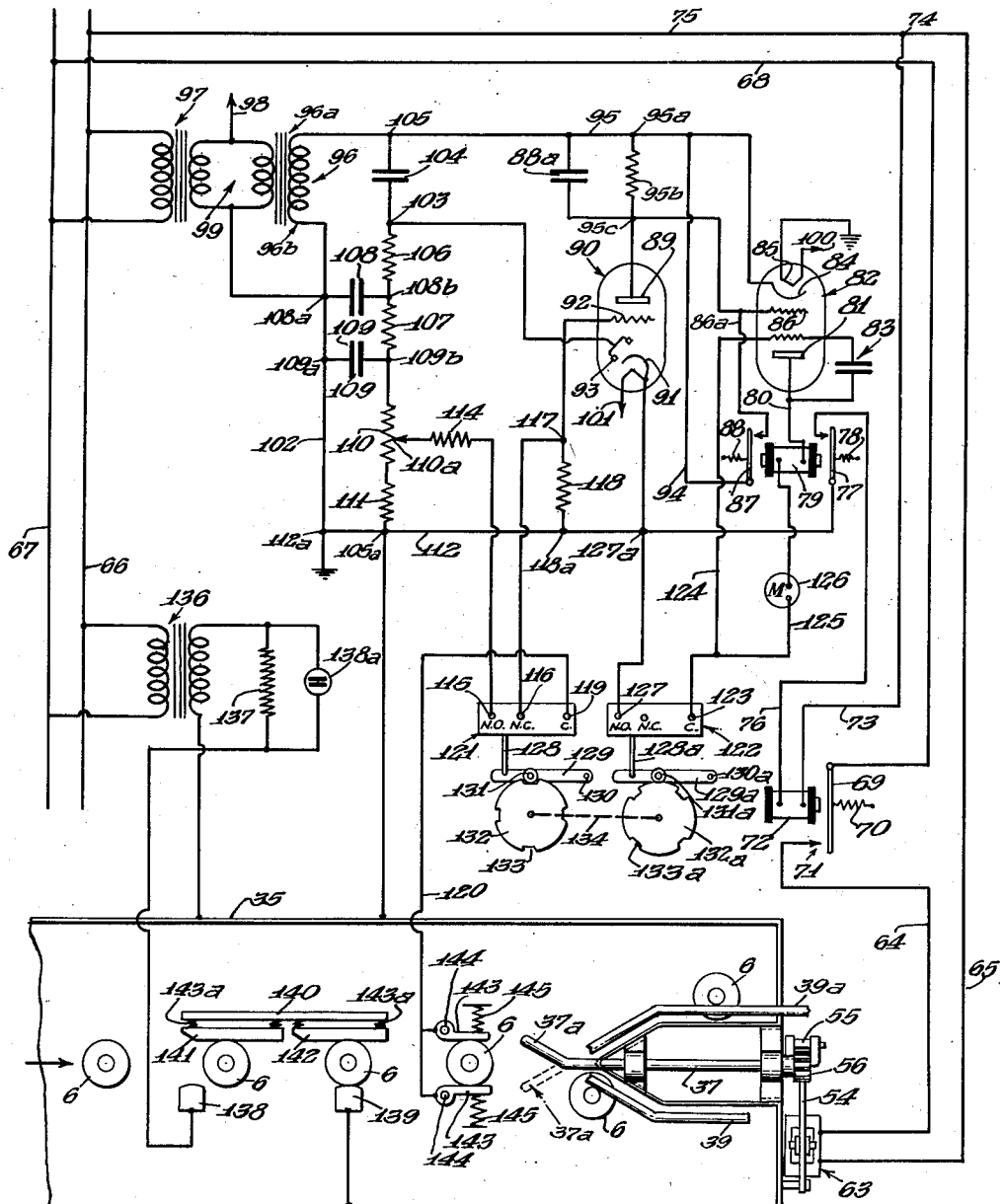
Fig. 8 is a circuit diagram of the testing apparatus.

Figs. 5 and 8 show testing shoes 138 and 139, and a pair of testing shoes 143. The electrical connections of said shoes and of the other parts of the circuit will be later more fully explained. It is sufficient at this point to state, that in the first of the three test positions which are respectively represented by the reference letter G in Fig. 5, each form is connected by the test shoe 138 to one terminal of a source of electric current, whose other terminal is grounded. The testing tank and its conductive liquid are grounded. Hence, each rubber object will then be subjected to dielectric stress at the first testing station G. If the rubber object has weak spots or if it has thin spots which are not perforated, but which will be perforated upon the application of the official pressure test by applying liquid under pressure, such weak or thin spots will be ruptured by the dielectric stress which is provided by the potential which is applied by means of the shoe 138. This is an important feature of the invention. Heretofore the electrical tests have proved ineffective if the rubber object was imperforate, even though said rubber object had thin or defective spots which would be ruptured by filling the rubber objects with liquid under suitable pressure. Therefore the electrical tester passed many rubber objects as perfect, even though they could not pass the liquid pressure test. According to our invention, the thin and defective parts of the rubber objects are mechanically ruptured by the dielectric stress which is applied by means of the shoe 138. As shown in Fig. 8, a respective form 6 preferably contacts with the next shoe 139, when no form 6 is contacting with shoe 138, although the invention is not limited to this feature. When a form 6 contacts with shoe 139, there is preferably no form in contact with shoes 143, although Fig. 8 shows a form contacting with shoes 143 and another form simultaneously contacting with shoe 139.

The next fixed shoe 139, which is grounded, discharges the electric charge from each form 6, so as to discharge a form on which a perfect rubber object has been located. The dielectric stress of such perfect rubber object is also discharged by grounding its form 6, since the conductive liquid is grounded. This is another important feature of our invention because otherwise such charge and such dielectric stress would result in the rejection of perfect rubber objects.

As shown in Fig. 8, the respective forms 6 are pressed against the shoes 138 and 139, in order to provide good electrical contact, by means of movable shoes 141 and 142 which are biased by means of compression springs 143a. One end of each compression spring 143a is fixed to a stationary rod 140. Suitable stops, not shown, are provided for limiting the movement of shoes 141 and 142 towards shoes 138 and 139.

The rod 140 and shoes 141 and 142 may be made of metal mounted on insulating material which is carried on insulating supports or said parts may be made of insulating material. They operate only mechanically, and do not form part of the electric circuit. The respective form 6 must not be grounded through the shoe 141. Hence members 140, 141 and 142 are insulated from the tank 35. Shoe 142 is insulated from the rod 140 and shoe 141, as well as from tank 35. However, shoe 142 may be grounded.

The shoes 143 are turnably mounted on respective pivots 144. Said shoes 143 are insulated from the ground and hence from the tank 35. Said shoes 143 are biased towards each other by means of compression springs 145, in order to make good electrical contact with the respective form 6, above the upper open end of the respective rubber object. Suitable conventional stops, which are not shown, can be provided in order to limit the movement of the shoes 143 towards each other.

Only one form at a time is located between and in contact with the shoes 143.

A selector or classifier 37 is located so that its inclined extension 37a is located at the classifying station H which is shown in Fig. 5. Said selector 37 has a straight longitudinal axis which is parallel to the longitudinal arrow 38 which is shown in Fig. 5.

The electrical operation of said selector will be later described. At this point, it is sufficient to state that, as shown in Figs. 5 and 6, a gear 56 is fixed to said selector 37, which is mounted turnably in suitable bearings which are provided in the frame F of the machine. Said gear 56 meshes with the teeth which are provided at the upper end of a rack bar 55, which is slidably vertically guided in a suitable fixed bearing. The lower end of said rack bar 55 is connected by a pivot pin 53 to the forked end of a lever 54 which is pivotally connected at 59 to a fixed stud 60. The lever 54 is pivotally connected by means of the pivot pin 52 to the forked head of a link 51, whose lower end is pivotally connected by the pivot pin 50 to the forked head 49 of a solenoid plunger 48. The solenoid of said plunger 48 is diagrammatically indicated by the reference numeral 63 in Fig. 8. Said solenoid 63 is located in a casing 47, in which the plunger 48 is slidably guided. The upper end of the biasing spring 57 is connected to a fixed stud 58.

In its normal position, the lever 54 is held by tension spring 57, inclined above the position which is shown in Fig. 6. In said normal position, the position of the inclined leg 37a is the broken-line "bad" position of Fig. 8. This corresponds to the location of a respective defective rubber object on the form which contacts with shoes 143. If said respective rubber object is defective, the inclined extension 37a will tilt the respective form, so that its sleeve 15 will ride along the fixed rail 39a.

According to our method, every object which is being tested is considered "bad" unless it is positively classified as "good." Hence, if there is a defective electrical part, or if the apparatus does not function properly for any reason, the objects will be rejected as "bad." This is an extremely important feature.

If said rubber object is good, the solenoid 63 will be energized to force plunger 48 downwardly, thus turning lever 54 clockwise, lowering rack bar 55, and turning selector 37 around its straight longitudinal axis through an angle of 180° from its normal position, to the "good" position which is shown in full lines in Fig. 8, and which is also shown in Fig. 6. The inclined extension 37a will then tilt the respective form clockwise or to the left, so that "good" forms will ride along guide 39. Fig. 6 shows a break in the guide 39, in order to clarify the illustration of the parts. Said guide 39 is continuous, like the guide 39a.

Fig. 6 shows how a "good" form is tilted to position 61 by the inclined extension 37a, and it shows another position 41 of a "good" form.

The guides 39 and 39a have inclined extensions 39b, which meet in a blunt end 40, in order to aid the classification of the forms into a "good" series along guide 39, and a "bad" series along guide 39a. This blunt end extends beyond the inner end of the inclined extension 37a.

The guides 39 and 39a and their extensions 39b are shaped to tilt the respective forms to respective horizontal positions, so that the forms clear the right-hand end wall of tank 35, after station H. The rubber objects do not contact with the walls of tank 35.

Therefore, assuming that the observer is at the right-hand end of the machine, the good rubber objects will be on forms which are tilted to the left and the bad rubber objects will be on forms which are tilted to the right. The forms are thus classified into two series by the classifying element 37 and the guides 39 and 39a.

Referring to Fig. 3, the guides 39 and 39a are shaped so that the substantially horizontal forms which clear the tank and the gear 56 and the top of the rack bar 55 and other obstructions are then tilted until their axes are substantially vertically downwardly directed. This permits excess testing liquid to drip off said rubber objects. This is done between the station M of Fig. 3 and the station L of Fig. 4. The guides 39 and 39a are then shaped so as to bring the axes of the forms back to the substantially horizontal position, so that the forms can be passed through a drier 42 which is heated by means of a steam coil 43. The drier 42 is provided with a blower 44 which is operated by a motor 45 and which produces an air current in the direction of the arrows 46.

Figure 10:
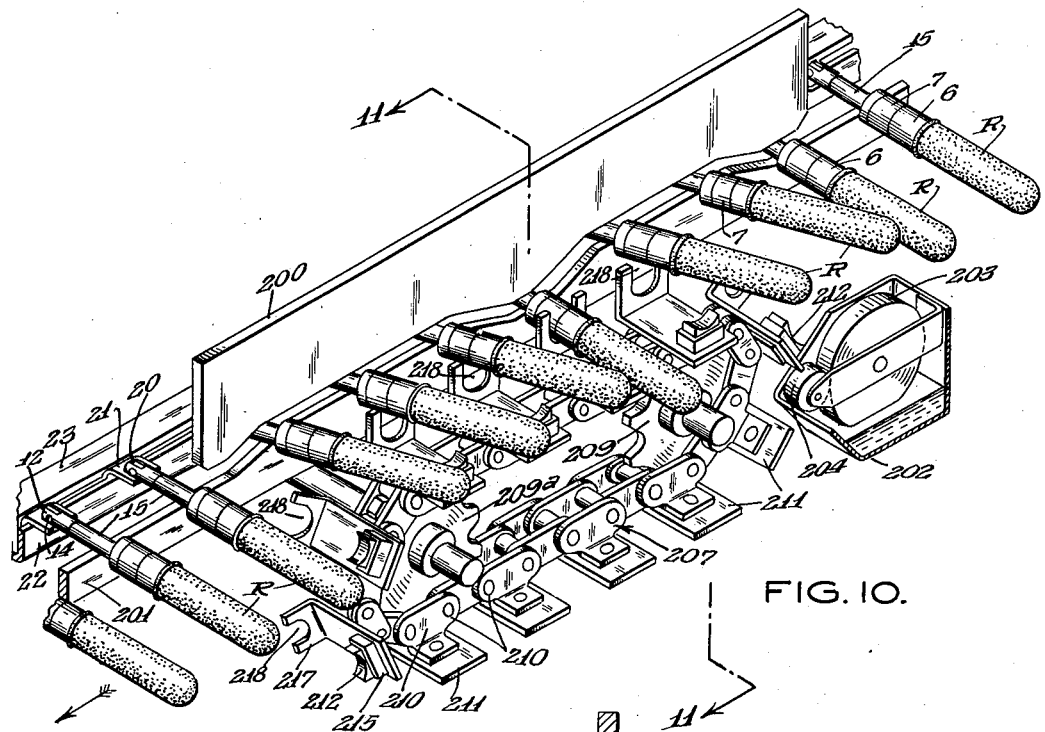
Fig. 10 is a detail perspective view of the marking mechanism.

The next operation is to mark the perfect forms at the station P which is shown in Figs. 2 and 4. The details of this marking apparatus are shown in Figs. 10–12 inclusive. The machine is provided with fixed guides 200 and 201 at said marking station P. The shapes of the adjacent edges of said fixed guides 200 and 201 is shown in Fig. 10. The ink or marking fluid is held in a tank 202 which is provided with the usual turnable dip roll 203 and the usual turnable transfer roll 204. The peripheries of the rolls 203 and 204 are pressed against each other, so that said rolls turn in unison under frictional force.

An auxiliary conveyor 207 consists of rigid links which are pivotally connected to each other. This auxiliary conveyor is endless and it is mounted upon the sprockets 209 and 209a. Alternate links 210 are provided with rigid supports 211. As shown in Fig. 12, a guide 215 is fixed to each support 211. A block 214 is slidably guided in each guide 215. Each block 214 is outwardly biased by compression springs 216, against suitable stops which are not shown. Each block 214 carries a marking pad 212 which is made of rubber or other resilient material. Each support 211 is also provided with a lug 217 which has a cut-out 218. The member 7 of each form meshes fully with one of said cut-outs 218, in the predetermined position which is illustrated in Fig. 10. The concave marking face of each marking pad 212 successively contacts with a part of the periphery of the transfer roll 204, so that the marking face of each pad receives its supply of ink from said roll 204. The roll 204 is turned through a small angle by each marking pad 212, thus provided a continuous supply of ink to said transfer roll 204.

The sprocket 209 is fixed to the shaft 208, to which the sprocket 206 is also fixed. The sprocket 206 is connected to the sprocket 205a by means of a chain 206a, part of which is shown in Fig. 11. The sprocket 205 is supported in a suitable bearing in the frame F of the machine, and said sprocket 205 meshes with and it is driven by the chain conveyor 1. Sprockets 205 and 205a are suitably connected.

The rubber objects are marked with a quick-drying fluid so that said rubber objects can be stripped from their forms, immediately after the printing operation.

Figure 14:
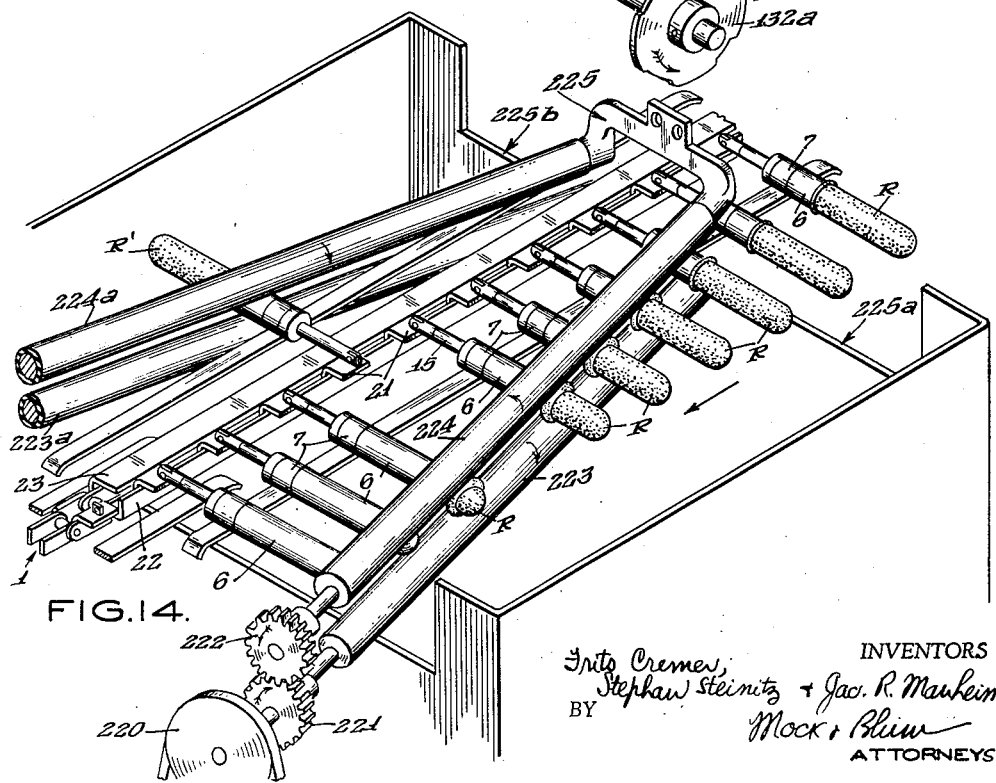
Fig. 14 is a detail perspective view of the stripping mechanism.

The stripping mechanism is shown in detail in Fig. 14. Fig. 3 shows a motor 219 which, by means of suitable conventional connections, drives the pulley 220 which is shown in Fig. 14. Gear 221 is fixed to the shaft of the pulley 220. Gear 221 meshes with an equal gear 222 which is fixed to the shaft of the stripper 224. The companion stripper 223 is fixed to the shaft of the pulley 220. Each said stripper 223 and 224 has an outer sleeve of resilient vulcanized rubber or the like. The shafts of said stripping rolls 223 and 224 are turnably mounted in a bracket 225 which is fixed to the frame F. Fig. 14 shows the identical companion stripping rolls 223a and 224a, which are driven by means of the motor 219a which is shown in Fig. 1. The good rubber objects are deposited in the bin 225a and the defective rubber objects are deposited in the bin 225b. In Fig. 1, the defective rubber objects are designated by the reference letter R'. Since Fig. 2 is a continuation of Fig. 1, the lines A—B and A'—B' designate the same part of the machine and the same applies to the lines C—D and C'—D'.

After the forms have been stripped, their axes are brought back to the upright vertical position by the fixed guides 31 and 32. Said fixed guides 31 and 32 diverge at the location of the tilting or push rod 226, so that the forms are separated into oppositely tilted respective series directly anterior the loading station E.

As shown in Fig. 8, the ends of solenoid 63 are respectively connected to wires 64 and 65. Wire 65 is connected by wire 75 to power main 66. Power mains 66 and 67 may deliver ordinary 60-cycle alternating current at 110 volts. Power main 67 is grounded and power main 66 is the ungrounded side of the power supply. Wire 64 has a contact terminal 71. The pivoted switch armature 69 of the electromagnetic relay 72 is biased away from contact terminal 71 by tension spring 70. One end of the coil of electromagnet or relay 72 is connected by wire 73 at point 74 to wire 75. The other end of the coil of electromagnet or relay 72 is connected by wire 76 to a contact terminal, from which pivoted switch armature 77 is biased by tension spring 78. Switch armature 77 is actuated by electromagnet or relay 79, when said relay 79 is energized, to touch its respective contact terminal. One end of the coil of electromagnet 79 is connected by wire 80 to the anode or plate 81 of a tetrode 82, which has an input grid 86, a cathode 84 and a screen which is connected to anode 80 by capacitance 83. We can use any type of electronic tube, instead of a tetrode. Cathode 84 has the usual heater 85, which has a grounded end and also an ungrounded contact end 100. Grid 86 is connected by wire 86a to a contact terminal from which the pivoted switch armature 87 is biased by tension spring 88. Said grid 86 is also connected to wire 95 through capacitance 88a, and also to point 95a of wire 95 through resistor 95b, and also to the anode or plate 89 of the triode 90. Said triode 90 has an input grid 92, two supplemental plates or anodes 93, and a cathode 91 which is heated by a heater which has an ungrounded contact end 101. The grid 92 controls the flow of space current only between anode 89 and cathode 91. The bias of grid 92 does not control the flow of space current between anodes 93 and cathode 91. We can use any type of electronic tube, instead of said triode 90.

The line wires 66 and 67 are connected to the primary coil of a step-down transformer 97, whose secondary coil is connected to the primary coil of a step-up transformer 96, whose ends 96a and 96b are respectively connected to wire 95 and to the ground wire 102.

The secondary coil of transformer 97 and the primary coil of transformer 96 form a closed low-voltage heating circuit, one side of which is connected to ground wire 102. The other side of said heating circuit is connected by wire 98 to the ungrounded ends of the electric heaters for the cathodes 84 and 91 of the respective electronic tubes 82 and 90.

Point 105 of wire 95 is connected through capacitance 104 to point 103, which is connected to grounded point 105a of wire 112, through the series resistors 106, 107, 110 and 111.

One end of wire 112 is connected at 112a to ground wire 102. The other end of wire 112 is connected to the pivoted end of switch armature 77. The point 127a of said wire 112 is connected to cathode 91 and to the grounded end of its heater.

Grid 92 is connected by a wire to point 117, which is connected by resistor 118 to point 118a of wire 112.

The primary coil of transformer 136 is connected to line wires 66 and 67 or to any other source of alternating current, whose voltage may be less or more than 110 volts. One end of the secondary coil of said transformer 136 is connected to the grounded metal tank 35 and the other end of said secondary coil is connected through gas lamp 138a and its shunt resistance 137 to shoe 138, which is fixed to a suitable insulated support, so that shoe 138 is insulated from tank 35 and the conductive testing liquid therein. Shoe 139 is grounded through tank 35.

The gas lamp 138a has a filling of neon or other gas of low pressure, in order to indicate the flow of current from insulated shoe 138 to the respective metal form and through the conductive test liquid to tank 35 and to the ground, if the respective rubber object has holes or defective spots. This provides a visual test of the condition of each rubber object, when its form contacts with shoe 138.

The circuit includes two identical conventional micro-switches 121 and 122.

Switch 121 has a blade which is pivoted at point 119 and which is biased so as to normally make connection between points 119 and 116, and to normally break connection between points 119 and 115. Hence point 119 is designated as "C.," meaning "Connecting"; point 115 is designated as "N. O." meaning "Normally open"; and point 116 is designated as "N. C.," meaning "Normally closed."

The blade of switch 121 is actuated so as to connect points 119 and 115, and to break the connection between points 119 and 116, against said biasing force, by a link or pusher 128 which is pivoted to lever 129, which is pivoted at 130. Roll 131 is turnably mounted on lever 129. Said roll 131 cooperates with recesses 133 of a cam wheel 132. Hence, when cam wheel 132 is rotated, lever 129 is intermittently turned in successive opposite directions, to intermittently make contact between point 119 and either point 115 or point 116.

This description also applies to cam switch 122, which utilizes only the "normally open" point 127.

Cam wheel 132a, which has recesses 133a, intermittently turns lever 129a, pivoted at 130a, so that link or pusher 128a intermittently makes and breaks contact between points 123 and 127. Roll 131a has the same function as roll 131. The levers 129 and 129a are biased by tension springs 129b, so that their respective rolls are urged towards the respective cam wheels.

Figure 9:
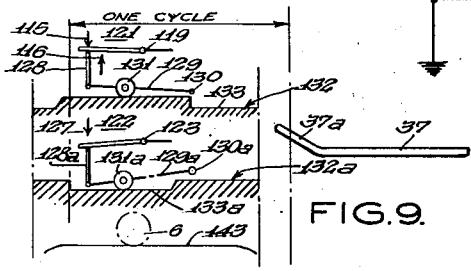
Fig. 9 is a detail view which illustrates the operations of certain of the parts, in a complete cycle of the electrical testing method.

Fig. 9 shows that points 123 and 127 are disconnected from each other, only when points 119 and 115 are connected to each other. During the period in which each respective form 6 contacts with shoes 143, points 115 and 119 are initially connected to each other, and they are then disconnected from each other, and points 119 and 116 are then connected to each other. Point 123 is connected by wire 125 and milliammeter 126 to one end of the coil of 79. Point 115 is connected by high resistance 114 to the movable contact point 119a which can be shifted along resistor 110.

Condensers 108 and 109 have respective terminals which are connected at 108a and 109a to the ground wire 102, and they have opposed terminals which are connected at 108b and 109b, to respective points located between resistors 106 and 107, and between resistors 107 and 110.

Figure 13:
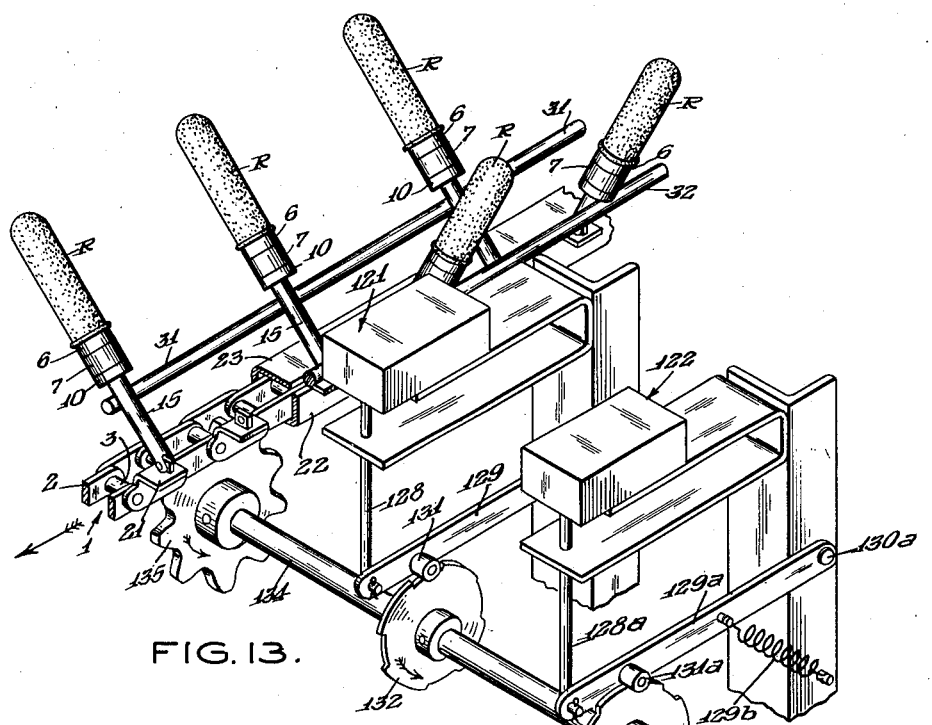
Fig. 13 is a perspective view which illustrates the actuating mechanism for the micro-switches, and certain adjacent parts.

As shown in Fig. 13, and diagrammatically indicated in Fig. 8, cam wheels 132 and 132a are fixed to a shaft 134. A sprocket 135, which is fixed to shaft 134, meshes with and it is driven by the conveyor 1. Fig. 9 shows the angular relations between the recesses of the cam wheels, and the rises between said recesses, and the timing of the testing operations between shoes 143.

The essential operation of the electrical testing method and mechanism is as follows:

The anodes 93 function as the anodes of a diode rectifier, in combination with cathode 91. A separate rectifier could be used. When point 96a is positive during the respective half-cycle of the alternating secondary voltage, current passes from point 105 through condenser 104 to point 103, and to the ground through said rectifier, and hence to the grounded end 96b. Current will also flow to the ground through resistors 106, 107, 110 and 111 to point 105a, to point 112a, and then to the ground. Since the condenser 108 is grounded at 108a and it is connected at 108b between resistors 106 and 107, and since condenser 109 is grounded at 109a and it is connected at 109b between resistors 107 and 110, said condensers 108 and 109 and said resistors 106, 107, 110 and 111, will function in the well-known manner so that the current between points 109b and 105a through resistors 110 and 111, will be a substantially constant unidirectional current.

The point 119a is adjustable along the resistor 110, so that a negative potential of about minus twelve volts is constantly impressed upon point 115, in testing a thin-walled rubber prophylactic. This picked-off voltage may be varied.

As shown in Fig. 9, immediately after a form contacts with shoes 143 at the anterior end-parts of said shoes 143, namely, the left-hand end-parts of said shoes as they are represented in Fig. 8, roll 131 will be raised to contact with a respective rise or raised part of cam wheel 132, between a pair of recesses 133. Shortly thereafter, roll 131a enters a recess 133a. Hence, while a form rides along the anterior end-parts of shoes 143, points 115 and 119 are first connected to each other, thus disconnecting points 119 and 116 from each other, and points 127 and 123 are then disconnected from each other. In any event, the points 127 and 123 are disconnected from each other, only after points 119 and 115 have been connected to each other. Points 127 and 123 will be subsequently reconnected to each other, before points 119 and 115 are disconnected from each other and before points 119 and 116 are connected to each other.

The sequence of testing steps or operations at shoes 143 is as follows:

First, points 119 and 115 are connected to each other, thus connecting shoes 143 to negative point 110a, whose negative voltage can be adjusted.

Secondly, the circuit of 82 is opened by disconnecting points 123 and 127. The second step takes place immediately after the first step. The first and second steps may be substantially simultaneous. Hence shoes 143 are connected to point 110a for about 0.5 second while the circuit of 82 is open, thus imposing a dielectric stress upon the respective object or body R, which is inversely proportional to the leakage current.

Thirdly, points 123 and 127 are connected to each other, thus closing the circuit of 82 through switch 122.

Fourthly, points 115 and 119 are disconnected from each other, and points 119 and 116 are connected to each other. The fourth step takes place immediately after the third step, and the third and fourth steps may be almost simultaneous. In the fourth step, whose period is about 0.5 second, the respective form or carrier 6 is connected to point 117 and hence to grid 92, while the circuit of 82 is closed. During this fourth step, the dielectric stress of the respective object R is reduced, because point 117 is grounded through the resistor 118, and the respective wall of the object remains in contact with the grounded conductive liquid. During the fourth step, if the respective object is defective, insufficient negative bias is imposed upon grid 92 to block tube 90. The tube 90 is considered as blocked, for the purposes of our invention, if the space current between 91—89 is zero, or if said space current does not exceed a predetermined minimum.

Hence, if the respective rubber object is defective, so that insufficient negative bias is imposed upon grid 92, a series of intermittent unidirectional current pulses will pass through resistor 95b during the fourth step, so that the potential of point 95c will be lower than that of 95a, by the IR drop through resistor 95b. The condenser 88a will thus be charged, so that its negative terminal will be connected to point 95c and hence to grid 86. Intermediate said intermittent current pulses, condenser 88a can discharge only through resistor 95b. During said fourth step, intermittent current pulses can be sent through tube 82, between 84 and 81, if permitted by the grid 86. The resistance 95b is sufficiently large, so that the discharges of capacitance 88a produces a substantially constant unidirectional current, if tube 90 is unblocked. If the respective object is defective, the IR drop will impose a sufficient negative bias on grid 86 so as to block tube 82, either by keeping the space current between 84 and 81 zero, or by preventing said current from being sufficiently high to operate relay 79. If the respective object meets the predetermined standard, the tube 90 will remain blocked during this fourth step, so that tube 82 will remain unblocked, thus energizing relay 79, and moving the classifying means out of the "bad" position to the "good" position.

After the respective object has been classified and before the next succeeding carrier 6 is located between shoes 143, points 123 and 127 are disconnected from each other, thus opening the circuit of tube 82, and points 115 and 119 are then again connected to each other, so that the apparatus can start a new cycle of testing operations.

At the beginning of each cycle, the first step is performed by connecting points 115 and 119 to each other, immediately after the respective carrier 6 contacts with shoes 143. Each carrier 6 remains in contact with shoes 143 during a total period of about one second.

If the respective object or body is below the required standard, sufficient current will leak through said object during the second step, so that the voltage of the respective carrier 6 will be substantially zero, before the respective carrier 6 is connected to point 116, thus keeping tube 90 unblocked, and keeping tube 82 blocked.

Unidirectional current pulses are sent through tube 82, between 84 and 81, if permitted by grid 86, intermediate the periods during which unidirectional current pulses can be sent through tube 90, if permitted by grid 92.

Hence the rubber wall is the dielectric of a condenser when its form and the conductive liquid are connected to opposite terminals of a source of electric current. One terminal of said source is the point 110a, which is connected to shoes 143 when points 115 and 119 are connected to each other. The other terminal of said source is grounded, being thus connected to the grounded conductive liquid.

The level 36 may be sufficiently high to test any desired height of the object. The invention can be used to test rigid battery jars and all objects or bodies which are made of insulating material, of any shape.

If the tube 90 is of the well-known type which is known in the trade as "6SQ7" and if the tube 82 is of the well-known type which is known in the trade as "6V6," the resistance of the resistor 95b may be 0.5 megohm, and the capacity of the condenser 88a may be 0.05 microfarad, if the secondary coil of transformer 96 supplies a 60-cycle alternating current whose maximum voltage is 110 volts.

Since the secondary coil of transformer 96 is a convenient source of 60 cycle alternating current of 110 volts, and since one end 96b of said secondary coil is grounded, the end 96a of said coil may be connected to that end of relay 72, which is shown as being connected to wire 73 in Fig. 8. This will eliminate the connecting point 74 to wire 75 and the connection of one end of said relay 72, to one of the power mains.

In previously used testing methods and testing devices, one or more mechanical testing parts were set normally so that in said normal position, "bad" articles would be rejected or classified as "bad" and "good" articles would pass through the testing device.

Hence, if the testing system was inaccurate or defective for any reason, "bad" objects would be passed through the testing device as "good." According to our invention, the mechanical testing device is normally biased to a position in which it classifies every object as "bad." Hence, if there is any defect or inaccuracy, all the tested objects will be rejected as "bad," even if they are "good." This is an important feature of the invention.

If all the objects are rejected as "bad," this can be readily observed, because the classified objects can be seen. Likewise, each movement of lever 54 from its normal biased position produces a click. If the clicks are not heard, the operator knows that the machine has become defective, since it is unlikely that all the objects in an entire run of objects can be defective.

Another important feature of our invention is that only the good rubber objects are printed or otherwise marked. Hence there cannot be any subsequent confusion between the bad and unmarked rubber objects. Due to the shape of the adjacent guide surfaces or bearing surfaces of the members 200 and 201, each rubber object is gradually pressed into marking abutment with a respective resilient concave pad 212, while the pad and the rubber object are moving longitudinally in unison. The use of a reciprocating stamp of the ordinary kind, which is sharply impacted against a rubber object, will injure said object and produce a blurred marking. This is eliminated according to our invention.

We have described a complete and preferred embodiment of our invention, but numerous changes and omissions can be made without departing from its scope, and the invention includes numerous valuable sub-combinations, which can be used independently of the complete system disclosed herein. For example, in testing a solid object made of insulating material, such object can be fixed to a metal carrier in any suitable manner. Likewise, the invention is not limited to the idea of initially using a voltage which is sufficiently high to rupture defective parts of the object under test, or to increase the size of original perforations in said object.

After the initial application of a relatively high voltage at shoe 138, if this step is used, the other test voltage or voltages may be much lower than 110 volts, because the test is a leakage test at shoes 143. The test voltage at shoes 143 may be as low as 6–9 volts, in testing prophylactics. This is an important feature, because a high test voltage will rupture the walls of good prophylactics. In ordinary testing devices, good prophylactics which are injured in the testing operation are frequently passed through the machine as "good." This is impossible in our system, because if any substantial leakage current passes through the object at shoes 143, the inclined extension 37a will remain in the rejecting or "bad" position.

Another important feature of our invention is that the forms are not rotated about their respective axes during the testing, and the rubber objects do not contact with anything during the testing, save the conductive liquid. In prior devices which have used mesh electrodes, there were numerous disadvantages.

The separation of the metal parts 6 and 10, by a substantial length of the insulating material of member 7 is also important. The forms remain heated after having passed through the drying tunnel, so that the conductive liquid tends to vaporize and to provide a conductive film between elements 6 and 10. Likewise, when the rubber object is partially immersed in the conductive liquid, some liquid may be splashed above the top end of the rubber object. By spacing members 6—10, at least 1 to 1.5 inches, these disadvantages are eliminated. The wall of member 6, adjacent the open end of object R, may be provided with a flush or substantially flush layer of insulating varnish or other material, in order to prevent any electrical connection between the inner open end of object R and the member 6. Hence the inner or open end portion of object R cannot be grounded.

In some cases, in which the objects have very thin rubber walls, it is desirable to wax said rubber walls, prior to testing, in order to prevent the aqueous conductive liquid from leaking through said thin rubber wall during the testing operation, and thus causing the rejection of "good" objects.

Each rubber object should be immersed in the liquid about 15 seconds, prior to testing, to allow the liquid to penetrate small holes.

Whenever the designation "classifying" is used in a claim or claims, this includes any means or method whereby the "bad" objects are segregated from the good objects in any manner.

Likewise, whenever we specify "means" in a claim or claims, this includes a single element or a plurality of elements, either electrical or mechanical.

We can use any means, continuous or intermittent for transporting the objects from the testing station to the classifying station. When we specify tilting means, such means can be positively actuated, or they depend on the force of gravity.

In order that the body or object which is being tested should be passed as "good," it must withstand a predetermined dielectric stress without passing a leakage current under said stress, which exceeds a predetermined leakage current. Prior to using said leakage current test, we subject the body or object to a disruptive dielectric stress. By a disruptive dielectric stress, we means a stress which will sufficiently lower the original resistance of said object, at any portion thereof whose dielectric strength is less than a predetermined minimum which is selected as a standard, so that the leakage current will subsequently exceed the maximum leakage current which is the selected standard for the body or object under test.

The forms or carriers 6 are normally ungrounded, due to the insulating members 7. The ground connections shown are merely one convenient way of completing the respective electrical circuits.

Said carriers 6 are at all times insulated from the conductive liquid, and said carriers 6 are put into the respective circuits externally to the body of liquid. Said carriers 6 may be maintained insulated from the conductive liquid wholly by the objects or bodies which are being tested, or partially by auxiliary insulating means and partially by the objects or bodies which are being tested.

When we refer to a shoe 138 as the first contact means at the first contact station, this is to define the location of said shoe 138 relative to the succeeding contact means, 143, and relative to the intermediate contact means 139. There may be other testing means, electrical or non-electrical, anterior shoe 138.

As soon as relay or electromagnet 79 is energized, switch armature 87 will be turned to contact with the respective contact terminal of wire 86a, thus connecting wire 95 directly to grid 86 through wire 94 and said switch armature 87 and said wire 86a, so that grid 86 will be maintained at the same potential as cathode 84. This provides, in effect, a holding circuit in order to maintain the current flow through tetrode 82 and the coil of electromagnet 79, as long as points 13 and 127 remain connected, until the classifying operation has been completed.

When relay 79 is energized, relay 72 will be energized because switch armature 77 will touch the contact point of wire 76, so that switch armature 69 will be actuated to close the circuit of solenoid 63. Said solenoid 63 and relay 72 are of the type which produce an effective unidirectional magnetic force and a unidirectional mechanical force, when the energizing current is an alternating current. The coil of relay 79 will remain energized by the intermittent unidirectional current which is supplied thereto, in order to hold the armatures 87 and 77 in their respective circuit-closing positions.

In the trade, the relay 72 is designated as "Type B24 Durkool Mercury Relay" and relay 79 is designated as "Allied Control Co. plate circuit relay Type PC."

The roll 131a will remain on a raised part of the cam wheel 133a until the respective form has passed beyond the inclined extension 37a so that its turntable sleeve 15 contacts with the respective member 39b. As shown in Fig. 9, the angle of each recess 133 and 133a is less than the angle of the respective adjacent raised part of the respective cam wheel.

When points 123 and 127 are disconnected, the connection between the anode 81 and point 127a is broken, thus deenergizing relay 79, so that armatures 87 and 77 are moved to their respective circuit-opening positions, thus deenergizing relay 72 and solenoid 63, thus returning extension 37a to its normal position which is shown in broken lines in Fig. 8.

During each complete rotation of the shaft 134 and its cam wheels 132 and 132a, four consecutive forms are tested between the shoes 143, each form passing beyond said shoes 143 before the next form contacts with said shoes 143.

In testing prophylactics, the value of the resistor 114 may be about 20 megohms. This is at least equal to the resistance of a good rubber prophylactic, which may equal or exceed 20 megohms.

If the rubber object is defective, its resistance is very much less than 20 megohms. Its average resistance is about one megohm, and it may even be much less.

The respective metal form will have an impressed negative voltage of about 6 volts, if a potential of about minus twelve volts is picked off the resistor 110, and if the rubber object has a resistance which is at least equal to that of the resistor 114.

If the rubber object is defective, it acts as the dielectric of a capacitance which is shunted by a low resistance leak, thus providing a correspondingly low difference of potential at the terminals of said capacitance.

The screen of tetrode 82 is connected by wire 124 to point 123, through a part of wire 125.

We can use any suitable source of constant direct current, whose positive terminal is grounded and whose negative terminal is connected to point 110a, instead of the means specifically illustrated herein.

The thickness of the wall of a rubber prophylactic should be about 0.0015 to 0.002 inch. The voltage which is supplied to shoe 138, in order to rupture thin and defective spots of such a wall, may be about 200–300 volts. These conditions will be varied, depending upon the type of object which is being tested. When we refer to rubber objects, we include all objects made of insulating material.

Fig. 7 shows that the insulating body 7 has a cylindrical enlargement 7a, which serves as a guide roll which can contact with guide tracks or the like. The mandrel 6 is provided at its tip with a relief bore 6a. It also has a relief opening 6b, which is uncovered by the prophylactic, and two additional relief openings 6c, which are covered by the prophylactic. The relief opening or vent 6b can be made larger than the openings 6a and 6c. Said openings 6a and 6c are very small. Said openings prevent the air in the hollow mandrel from being pocketed when a rubber object is placed on the mandrel.

The modification of Fig. 18 shows a drive shaft 409, to which sprockets 411 and 209a are fixed. Disc 400 is fixed to the shaft of sprocket 408. Sprocket 410 is fixed to a turnable idler shaft. Endless chain 407 meshes with sprockets 408, 411, and 410. A series of convex inking pads 401 are fixed to respective heads 402. A radial shank 402a is fixed to each head 402. Each shank 402a has two radial slots. A guide pin 402b which is fixed to disc 400, extends through each said radial slot. Each shank 402a is slidable relative to its guide pins 402b. Each head 402 is fixed to a radial pin 405, which is radially slidable in a bore of a lug 403, which is fixed to disc 400. A head 404 is fixed to each pin 405. A compression spring 406 biases a respective head 402 to the outer normal position which is shown in Fig. 18a. The pins 402b act as stops to limit the radial back-and-forth movement of the respective head 402.

The disc 400 is thus rotated in unison with the sprockets 209a and 209. Each concave marking pad thus meshes intermittently with an inking pad 401 in the position which is shown in Fig. 18, so that ink is transferred from the inking pad 401 to a stamping pad 212. The inking pads 401 are supplied with ink in any suitable manner.

An important feature of our invention is the controlled and automatic supervision and testing method, whereby it is impossible for a defective object to be classified as good.

While we have described a preferred complete embodiment, the invention includes numerous sub-combinations, which can be used independently of the complete combination illustrated herein. The improved method can be put into practice by many types of mechanism, automatic and non-automatic.

We claim:

1. In mechanism for classifying objects which are made of insulating material, an endless conveyor, means for supporting and actuating said conveyor in a predetermined endless path, carriers tiltably connected to said conveyor, said carriers being tiltable relative to the conveyor in respective opposite directions, said carriers being adapted to carry said objects, said conveyor being located intermediate fixed guides, said carriers being tiltable to contact slidably with either of said guides, movable and automatically operated tilting means constructed and operative to tilt some of said carriers to contact with one of said guides and to tilt the other carriers to contact with the other of said guides.

2. In mechanism according to claim 1, tilting means which include a push member and means for actuating said push member to tilt alternate carriers to contact with one of said guides.

3. Mechanism according to claim 1, in which said fixed guides have respective different portions thereof differently spaced from said intermediate conveyor, in order to vary the tilt of said carriers.

4. Mechanism for testing objects made of insulating material, said mechanism including a grounded tank, a body of conductive liquid located in said tank up to a predetermined level, an endless conveyor, means for guiding and actuating said conveyor in a closed path, conductive carriers connected to and insulated from said conveyor, said carriers being spaced from each other and being adapted to carry said objects, a part of said conveyor being located to immerse said objects on said part at least partially in said conductive liquid, said carriers being at all times maintained insulated from said conductive liquid, ungrounded first contact means located to contact with each conductive carrier externally to said body of liquid while the respective object contacts with said body of liquid, said first contact means being connected to one side of a first source of potential difference whose other side is grounded so that each object is subjected to dielectric stress by said first source of potential difference, additional ungrounded contact means located after said first contact means and located to contact with each conductive carrier externally to said body of liquid while the respective object contacts with said body of liquid, said additional contact means being connected to one side of an additional source of potential difference whose other side is grounded so as to pass a leakage current through the respective object, the potential difference of the first source being greater than the potential difference of the second source, movable classifying means located after said additional contact means, said classifying means being movable to a respective "bad" position which corresponds to the location of a defective object on the respective carrier which contacts with said additional contact means, said classifying means being also movable to a "good" position which corresponds to the location of a good object on the respective carrier which contacts with said additional contact means, said classifying means being biased to the "bad" position, electro-mechanical means having a normally open circuit, said electro-mechanical means being connected to said classifying means and moving said classifying means to the "good" position when said circuit is closed, said circuit having circuit-closing means which are biased to the circuit-opening position, electrical actuating means for moving said circuit-closing means to circuit-closing position when said electrical actuating means are energized, said electrical actuating means having a normally open circuit, control means operated and controlled by said leakage current to close the circuit of said electrical actuating means only when said leakage current is less than a predetermined minimum.

5. In a machine for classifying objects made of insulating material, the sub-combination of an endless conveyor, means for guiding and actuating said conveyor in a predetermined path, spaced conductive carriers for said objects, said carriers being tiltably connected to said conveyor, a part of said conveyor being located intermediate spaced guides, said guides having anterior portions which are inclined towards each other, a selector which is turnable in respective opposed directions, said selector having an inclined leg at its anterior end, said leg being located anterior said anterior inclined portions, said selector being turnable to respective positions in which its leg will tilt a carrier relative to said conveyor to ride along one or the other of said anterior portions and the respective guide, said selector being biased to a normal position in which said leg will tilt the carriers to ride along one of said anterior portions and the respective guide.

6. Mechanism for testing and classifying objects which are made of insulating material, comprising a testing station and a succeeding classifying station, transporting means for transporting said objects to said testing station and subsequently to said classifying station, insulating contact means located at said testing station and adapted to electrically connect a part of each object at said testing station to one side of a source of testing current, each said object being thus maintained thus electrically connected during a predetermined period, additional contact means located at said testing station and connecting another part of each object at said testing station to the other side of said source of testing current in order to subject each object to a leakage current test at said testing station, said classifying station having classifying means which are biased to a "bad" position and which are movable from said "bad" position to a "good" position, electro-mechanical means having a normally open circuit and adapted to move said classifying means to the "good" position only when said circuit is closed, said circuit of said electro-mechanical means having circuit-closing means which are biased to the circuit-opening position, a first electrical relay which is adapted to move said circuit-closing means to the circuit-closing position when said first relay is energized, said first relay having a normally open circuit, the circuit of said first relay having circuit-closing means which are biased to the circuit-opening position, a second electrical relay which is adapted to move said last-mentioned circuit-closing means to circuit-closing position when said second relay is energized, one end of the second relay being connected to the anode of a first electronic tube which has a first input grid, the cathode of said first electronic tube being connected to one side of a source of alternating current, the other end of the second relay being permanently connected to the movable circuit-closing element of a first switch, said first switch having a contact point from which said circuit-closing element is normally biased, said contact point being connected to the other side of said source of alternating current so that current is passed through said second relay and through said first electronic tube when said circuit-closing element makes connection with its respective contact point during each half-cycle in which said alternating current is in the proper direction and if the negative bias of said first input grid is sufficiently small, a second electronic tube which has a second input grid, the anode of said second electronic tube being connected to the side of said source of alternating current to which the cathode of the first electronic tube is connected, the cathode of the second electronic tube being connected to the same side of said source of alternating current to which the anode of the first electronic tube can be connected, a resistor located between the anode of the second electronic tube and the side of said source of alternating current to which the cathode of the first electronic tube is connected, the first input grid being connected between the anode of said second electronic tube and said resistor so that said first input grid is maintained at a lower potential than the cathode of said first electronic tube by the IR drop in said resistor when current flows through said second electronic tube, the resultant negative bias of said first input grid being sufficient substantially to block said first input tube while said IR drop is defective so that said second relay then remains de-energized, said second input grid being connected to its respective cathode through a grid leak, a second switch which has a second circuit-closing element which is permanently connected to a first contact point of said second switch, said second switch having a second contact point and a third contact point, said circuit-closing element of said second switch being biased to contact with said second contact point and out of contact with said third contact point, said circuit-closing element being movable to connect the first contact point of the second switch either to its second contact point or to its third contact point, said second contact point being connected to said second input grid anterior said grid leak, said first contact point being permanently connected to said insulated contact means of said testing station, said third contact point being connected to a source of negative potential, automatic means controlling said respective circuit-closing members during said predetermined period, first to connect said first and third contact points to each other and simultaneously to disconnect said first and second contact points from each other, then to permit the circuit-closing element of the first switch to move out of contact with its respective contact point while said first and third contact points remain connected to each other, then to move the circuit-closing element of the first switch into contact with its respective contact point while said first and third contact points remain connected to each other, and then to disconnect said first and third contact point of the second switch and simultaneously to connect the first and second contact points of the second switch, an additional normally open circuit which is adapted to connect said first input grid directly to its respective cathode, said additional circuit having circuit-closing means which are biased to the circuit-opening position, said second relay actuating said last-mentioned circuit-closing means to the circuit-closing position when said second relay is energized, in order to keep the first electronic tube unblocked if said second relay has been energized, as long as the circuit-closing element of the first switch contacts with its respective contact point, said period being longer than the period of said alternating current.

7. Mechanism for testing an object made of insulating material, comprising a carrier made of conductive material and which is adapted to contact with and to carry said object, a contact element, transport means adapted to transport said carrier to contact with said contact element, said contact element being located at a testing station, an auxiliary contact element located at said testing station and which is adapted to contact with said object at a point at which said object is spaced from said carrier, a testing source of predetermined undirectional current which has a negative terminal which is adapted to be connected to said contact element, the positive terminal of said testing source being connected to said auxiliary contact element, a control electronic tube, a main electronic tube, each said tube having an anode and a cathode and a grid, the circuit of said control electronic tube including a resistance and a condenser connected in shunt across said resistance, said tubes being oppositely connected to a power source of alternating current so that intermittent current pulses are sent alternately through said tubes when permitted by their respective grids, the grid of the main electronic tube being connected to the end of said resistance which is negative when current passes through said resistance and said control electronic tube, automatic switch means operable while said carrier contacts with said contact element, first to connect said contact element to said negative terminal, then to open the circuit of said main electronic tube, then to close the circuit of said main electronic tube, then to connect said contact element to the grid of said control electronic tube after disconnecting said contact element from said negative terminal, means to discharge any residual charge on the grid of said electronic tube upon the completion of the test, classifying mechanism operable by current which passes through said main electronic tube.

8. Mechanism for classifying objects made of insulating material, comprising an endless conveyor, means for guiding and actuating said conveyor in a predetermined path, said conveyor having spaced carriers tiltably connected thereto, each said carrier being tiltable relative to said conveyor in respective opposed directions, each said carrier being adapted to carry a respective object, an electric testing station, means located at said testing station to send a respective testing current through each said respective object, automatic and electrically operated and movable classifying means constructed and operative to be moved to one selected position to tilt each carrier in one said direction if the respective testing current of the respective object exceeds a predetermined amperage and to be moved to another selected position to tilt each carrier in the opposed direction if said respective testing current is less than said predetermined amperage, said classifying means being operated and controlled by said respective testing currents so that the respective selected position is determined by the amperage of the respective testing current.

9. Mechanism according to claim 8, including stripping means adapted to strip said objects from their respective carriers after said carriers have been tilted in one of said directions.

10. In mechanism for testing objects made of insulating material, an endless conveyor, means adapted to guide and actuate said conveyor in an endless path, said conveyor having spaced carriers for said objects movably connected thereto, each said carrier being movable in unison with said conveyor in said endless path and being also movable relative to said conveyor, an electric testing station, means located at said testing station to send a respective testing current through each said respective object, automatic and electrically operated and movable classifying means constructed and operative to move each carrier to a respective classified position relative to said carrier, said respective classified position being selected by the amperage of the respective testing current, said classifying means being operated and controlled by the respective testing currents to move the respective carriers to said respective classified positions.

FRITS CREMER.
STEPHAN STEINITZ.
JAC. R. MANHEIMER.

(References on following page)

REFERENCES CITED

The following references are of record in the file of this patent:

UNITED STATES PATENTS

| Number | Name | Date |
|---|---|---|
| 1,254,690 | Hazard | Jan. 29, 1918 |
| 1,369,570 | Stiles | Feb. 22, 1921 |
| 1,651,925 | Marsh | Dec. 6, 1927 |
| 1,860,358 | Hall | May 31, 1932 |
| 1,983,892 | Barton | Dec. 11, 1934 |
| 2,016,455 | Purdy | Oct. 8, 1935 |
| 2,084,186 | Braden | June 15, 1937 |
| 2,221,323 | Gammeter | Nov. 12, 1940 |
| 2,244,591 | Youngs | June 3, 1941 |
| 2,244,592 | Youngs | June 3, 1941 |
| 2,278,652 | Gammeter | Apr. 7, 1942 |